United States Patent
Sugita et al.

(10) Patent No.: US 7,124,307 B2
(45) Date of Patent: Oct. 17, 2006

(54) DETECTING DEVICE ABNORMALITY BY COMPARING A CURRENT VALUE OF CURRENT OF ELECTRIC POWER WITH A PRESET DETECTING CURRENT VALUE BASED ON A THRESHOLD VALUE RECEIVED BY THE DEVICE

(75) Inventors: Hiroshi Sugita, Iwatsuki (JP); Kenichi Sonobe, Iwatsuki (JP); Tomokazu Kaneko, Iwatsuki (JP); Hirota Takahashi, Iwatsuki (JP); Kazuya Edogawa, Iwatsuki (JP); Tsutomu Hoshino, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 540 days.

(21) Appl. No.: 10/329,693

(22) Filed: Dec. 27, 2002

(65) Prior Publication Data

US 2003/0172318 A1 Sep. 11, 2003

(30) Foreign Application Priority Data

Mar. 7, 2002 (JP) .............................. 2002-062005

(51) Int. Cl.
*G06F 1/26* (2006.01)
*G06F 11/00* (2006.01)

(52) U.S. Cl. ........................................ 713/300; 714/48
(58) Field of Classification Search ................ 713/300, 713/310, 340; 714/48
See application file for complete search history.

(56) References Cited

U.S. PATENT DOCUMENTS

| 4,996,646 | A | * | 2/1991 | Farrington | .................. 700/293 |
|---|---|---|---|---|---|
| 6,067,628 | A | * | 5/2000 | Krithivas et al. | ........... 713/340 |
| 6,105,097 | A | * | 8/2000 | Larky et al. | ................. 710/314 |
| 6,125,455 | A | * | 9/2000 | Yeo | .............................. 714/14 |
| 6,304,978 | B1 | * | 10/2001 | Horigan et al. | ............. 713/322 |
| 6,526,516 | B1 | * | 2/2003 | Ishikawa et al. | ............ 713/340 |
| 6,594,771 | B1 | * | 7/2003 | Koerber et al. | ............. 713/330 |
| 6,963,986 | B1 | * | 11/2005 | Briggs et al. | ................ 713/320 |
| 2004/0003310 | A1 | * | 1/2004 | Hsu et al. | .................... 713/320 |

FOREIGN PATENT DOCUMENTS

| JP | A-2000-217247 | 8/2000 |
|---|---|---|
| JP | A 2002-51449 | 2/2002 |

OTHER PUBLICATIONS

Micrel, MIC2012/MIC2072 USB Power Controller, Sep. 2000, pp. 1-10.*
Universal Serial Bus Specification Rev. 2.0, Apr. 27, 2000, pp. 154-156, 171-174, 243-245.*

* cited by examiner

*Primary Examiner*—Thomas Lee
*Assistant Examiner*—Mark Connolly
(74) *Attorney, Agent, or Firm*—Oliff & Berridge, PLC

(57) ABSTRACT

A USB device for supplying current to a device connected thereto through a USB interface. In this USB device, current values requested by the devices are preset, as detecting current values, in detector registers of current detecting parts. The current detecting parts constantly monitor current values of electric powers supplied to the devices. Each current detecting part compares a related detecting current value with a related supplied current value. If the supplied current value exceeds the detecting current value, the current detecting part informs a current detection control part of abnormality occurrence. The current detection control part sets a bit in a no-good status register, which corresponds to the current detecting part having informed the abnormality occurrence, and interrupts a CPU. In turn, the CPU refers to the no-good status register and specifies the failure device, and interrupts a current supplying path connecting to the failure device.

7 Claims, 3 Drawing Sheets

DETECTING DEVICE ABNORMALITY BY COMPARING A CURRENT VALUE OF CURRENT OF ELECTRIC POWER WITH A PRESET DETECTING CURRENT VALUE BASED ON A THRESHOLD VALUE RECEIVED BY THE DEVICE

BACKGROUND OF THE INVENTION

1. Field of the Invention

The present invention relates to an USB device which is connected to devices through a USB interface and is capable of feeding current to those devices.

2. Background Art

The USB interface is a 4-wire serial interface, and contains two data lines (D+, D−), a power supplying line (Vbus), and a ground line (GND). The USB device is capable of supplying electric power to the devices through power supplying lines. Therefore, the devices are operable in a state that power sources are not contained in the devices. The USB interface standards describe that the maximum electric power allowed to be supplied is 5 V and 500 mA.

Most of the host side USB devices each having the current supplying capability are provided with an overcurrent protecting device which operates when a current value of current fed to the device exceeds 500 mA as a normal value, and restricts the mount of current to flow. The overcurrent protecting device prevents the related parts of the device from being damaged by the overcurrent.

The conventional USB device restricts the supplied current when it reaches 500 mA, but cannot detect an abnormality of such overcurrent. When a trouble occurs in the power source circuit in the device usually consuming the current of only 100 mA, for example, overcurrent flows. In this case, the host side USB device merely limits the current to below 500 mA, and cannot detect such an abnormal state that current of 500 mA or larger flows through the device consuming the current of only 100 mA.

The host side USB device, widely used, includes a plurality of USB ports at which the USB device maybe coupled to a plurality of devices. Such a USB device has also the capability to supply electric power to the devices through the USB ports. In this case, a single power source is shared with those USB ports, and delivers electric power to the USB ports.

In the system containing the USB device and the plurality of devices connected to the USB device through the USB ports, when a trouble occurs in the device coupled to a certain USB port, and the amount of current increases, the voltage drop occurs and will adversely affect other devices.

SUMMARY OF THE INVENTION

Accordingly, an object of the invention is to provide a USB device which detects a failure of a device or devices connected thereto and which blocks adverse effects of the failure device on the remaining devices connected, and hence enhances a reliability of the device operation.

The present invention may be summarized such that a current value of current of electric power supplied from a host-side device to a device is compared with a preset detecting current value, e.g., a current value of current consumed by the device, and when the current value of supplied current exceeds the preset detecting current value, the USB device decides that the device fed with the excessive current is abnormal. For a device consuming current of only 100 mA, for example, 100 mA is set as the detecting current value. When current exceeding 100 mA, flows, the USB device judges that the device malfunctions and an abnormal state is present.

Where the USB device is provided with a plurality of USB ports, the current values are compared for each USB port, and the USB device recognizes a device abnormality for each device connecting to the USB port. The detecting current value is set as a fixed value. Further, a current value requested by a device through the communication with the device, may be set as the detecting current value.

Thus, when a device is judged to be abnormal, the current supplying path connecting to the abnormal device may be interrupted. Particularly in the USB device having the plurality of USB ports, much current flows through the failure device and the power voltage drops, and the voltage drop will adversely affect the remaining devices. The interruption of the current supplying path to the device judged to be abnormal leads to prevention of the adverse influence on the remaining devices, and enhanced reliability of the device operations.

DETAILED DESCRIPTION OF THE PREFERRED EMBODIMENTS

Figure 1:
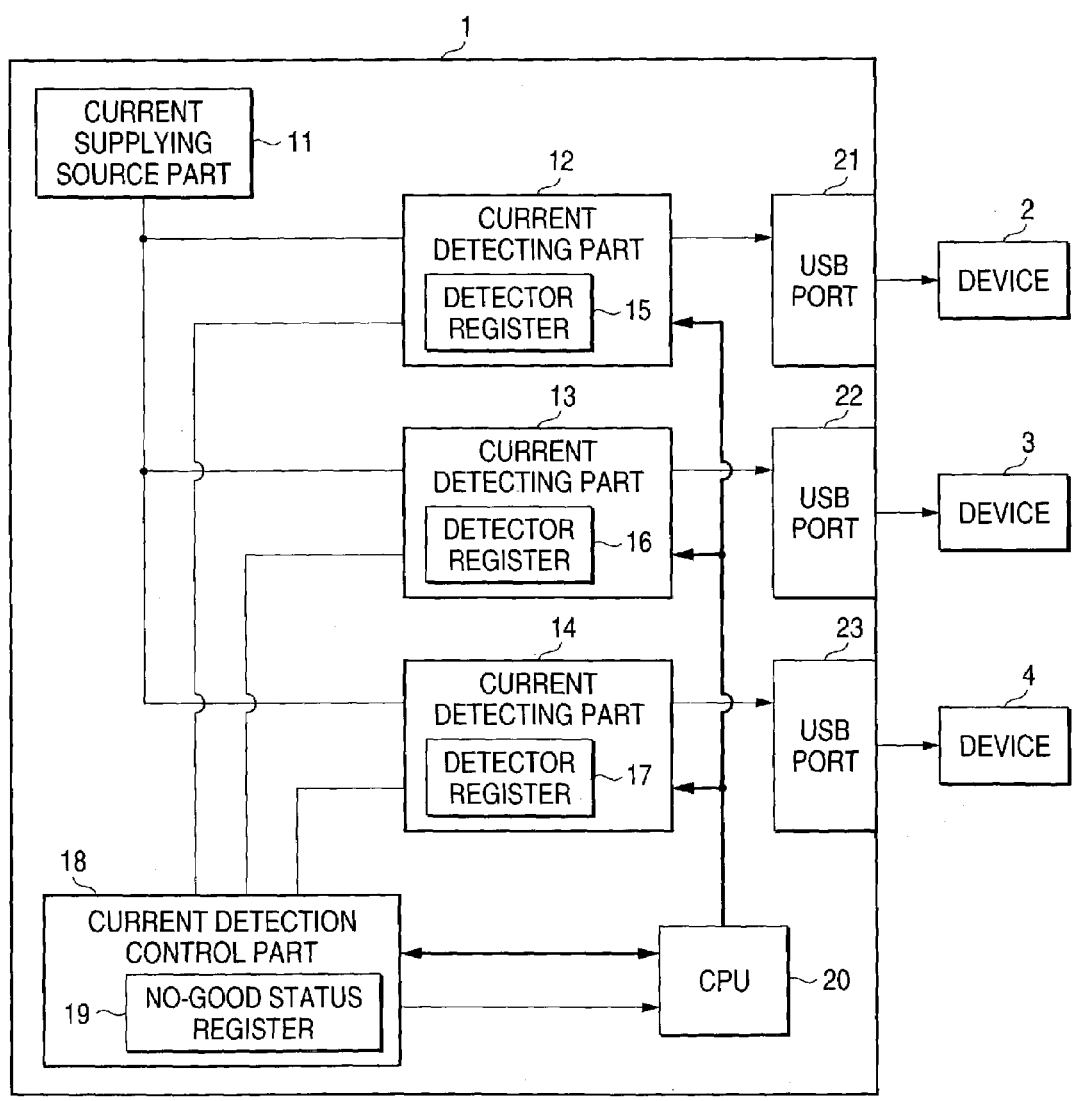
FIG. 1 is a block diagram showing an embodiment of a USB device according to the invention.

FIG. 1 is a block diagram showing an embodiment of a USB device according to the invention. In the figure, reference numeral 1 is a host device; 2 to 4 are devices; 11 is a current supplying source part; 12 to 14 are current detecting parts; 15 to 17 are detector registers; 18 is a current detection control part; 19 is a defective status register; 20 is a CPU; and 21 to 23 are USB ports. In the instance shown in FIG. 1, the host device 1 is a USB device, and has three USB ports 21 to 23 to communicate through the USB interface. The device 2 is connected to the USB port 21; the device 3 is connected to the USB port 22; and the device 4 is connected to the USB port 23. The devices 2 to 4 are capable of communication through the USB interface. Each of those devices may receive electric power from the host device 1, if necessary. Each of those devices 2 to 4 has a function to inform the host device 1 of a current value of current consumed by the device through its communication with the host device 1.

As described above, the USB interface allows the host device 1 to supply electric power to the devices 2 to 4. The current supplying source part 11 is a supplying source for supplying electric power to the devices 2 to 4. The current supplying source part 11 supplies electric power to the devices 2 to 4 by way of current detecting parts 12 to 14 and the USB ports 21 to 23.

The current detecting part 12 detects a current value of current being fed through the USB port 21 to the device 2, and compares the detected current value with a detecting current value preset in the detector register 15. If the supplied current value exceeds the preset detecting current value, the current detecting part informs the current detection control part 18 of that. In this instance, the current detecting part 12 contains a switching circuit for interrupting the current supplying path. The switching circuit interrupts the current supplying path according to an instruction by the CPU 20.

The detector register 15 is provided in association with the current detecting part 12, and in this instance, retains a detecting current value as is written by the CPU 20. If required, any other suitable means may be used for writing or setting the current value in the detector register.

The remaining current detecting parts 13 and 14 are likewise associated with detector registers 16 and 17 for retaining the current values, respectively. The current detecting part 13 compares a current value of the electric power supplied through the USB port 22 to the device 3, with a detecting current value preset in the detector register 16. If the current value is in excess of the preset current value, it informs the current detection control part 18 of that. The current detecting part 14 compares a current value of the electric power supplied through the USB port 23 to the device 4, with a detecting current value preset in the detector register 17. If the current value is in excess of the preset current value, it informs the current detection control part 18 of that. The current detecting parts 13 and 14 also include each means for interrupting the current supplying path itself.

When the current detection control part 18 receives from any of the current detecting parts 12 to 14 information that the current value of the supplied electric power, the current detection control part changes bit information in the defective status register 19, which corresponds to the current detecting part having sent the information, and informs the CPU 20 of the device trouble by interruption to the CPU.

The no-good status register 19 contains good and no good information on the devices connected to the USB ports 21 to 23. Bits are assigned corresponding to the USB ports 21 to 23 (i.e., current detecting parts 12 to 14), respectively. The contents of the no-good status register 19 may be read out by the CPU 20. The no-good status register may be reset by the CPU 20 at the time of initializing, for example.

The CPU 20 carries out various processes in the host device 1. Particularly in this instance, the CPU communicates with each of the devices 2 to 4 through a communication means (not shown) which performs communication through the USB interface (not shown), and acquires a current value consumed by each device. And, the CPU sets the acquired current value in the related detector register of those registers 15 to 17 in the current detecting parts 12 to 14, viz., it serves as current value setting means. When the CPU receives from the current detection control part 18 information that the device is abnormal, it refers to the no-good status register 19 in the current detection control part 18 and specifies the USB port coupled to the abnormal device. And the CPU instructs the switching circuit in the current detecting part connected to the specified USB port to interrupt the current supplying path, viz., it serves as a current control means for performing the control of interrupting the current supplying path. Further, the CPU may execute a process to inform the user that the device connected to the specified USB port is abnormal.

While three USB ports are provided in the instance shown in FIG. 1, an optical number of USB ports may be used, as a matter of course. The switching circuit for interrupting the current supplying path to the USB port may be provided separately from the current detecting part. The function of the current detection control part 18 may be assigned to the CPU 20. Reversely, some of the functions of the CPU 20 maybe implemented by using other means. If the overcurrent protecting circuit is provided as in the conventional case, the circuit is protected against overcurrent.

Figure 2:
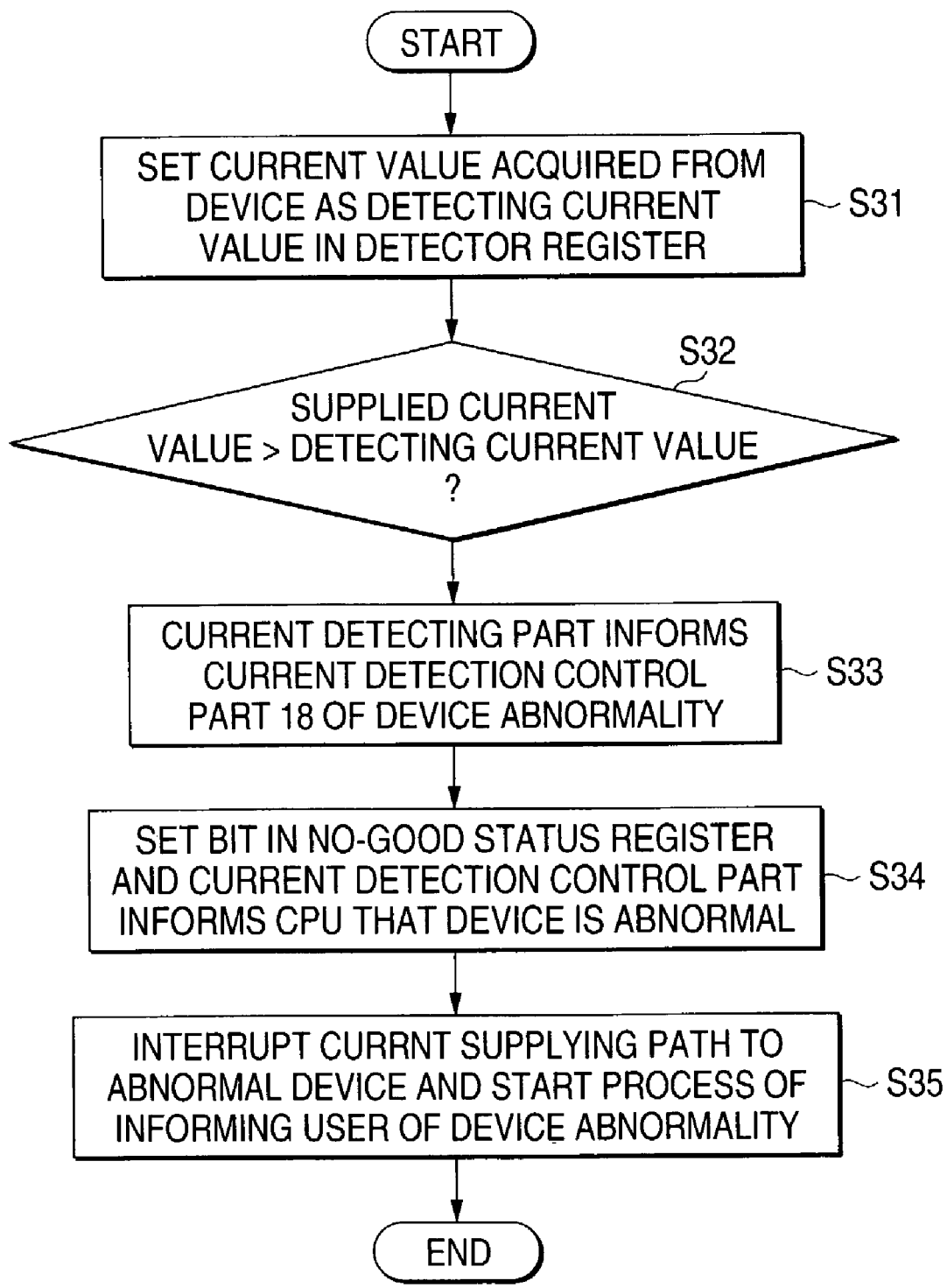
FIG. 2 is a flow chart showing a device abnormality detecting operation in the USB device.

FIG. 2 is a flow chart showing a device abnormality detecting operation in the USB device of the invention. To start, the CPU 20 acquires values of current consumed by the devices 2 to 4 from those devices connected to the USB ports 21 to 23 (step S31). The acquisition of the current values may be carried out, for example, at an initializing stage immediately after the devices 2 to 4 are connected to the USB ports 21 to 23.

The CPU 20 sets a current value acquired from the device 2, for example, as a detecting current value in the detector register 15. Similarly, the CPU sets a current value acquired from the device 3 as a detecting current value in the detector register 16, and sets a current value acquired from the device 4 as a detecting current value in the detector register 17. It resets the no-good status register 19 in the current detection control part 18.

Subsequently, the current detecting parts 12 to 14 monitor currents supplied to the devices 2 to 4 (step S32). The current detecting part 12 compares a current value of current supplied to the device 2 with a detecting current value preset in the detector register 15. If the current value of the supplied current is smaller than the detecting current value, the current detecting part continues the current monitoring. If the former current value exceeds the latter current value, the current detecting part 12 informs the current detection control part 18 of that (step S33). The current detecting part 13 also compares a current value of current supplied to the device 3 with a detecting current value preset in the detector register 16. If the current value of the supplied current is smaller than the detecting current value, the current detecting part continues the current monitoring. If the supplied current value exceeds the detecting current value, the current detecting part 13 informs the current detection control part 18 of that (step S33). Further, the current detecting part 14 also compares a current value of current supplied to the device 3 with a detecting current value preset in the detector register 16. If the current value of the supplied current is smaller than the detecting current value, the current detecting part continues the current monitoring. If the supplied current value exceeds the detecting current value, the current detecting part 13 informs the current detection control part 18 of that (step S33). In the current value comparing operations by the current detecting parts 12 to 14, the current value coincidence judgment may be made allowing for some variation of the current value.

When the current detection control part 18 receives from any of the current detecting parts 12 to 14 a report that the supplied current value exceeds the detecting current value, the current detection control part 18 sets a bit in the no-good status register 19, which the bit corresponds to the current detecting part having sent the report (i.e., corresponding to the device judged to be abnormal) (step S34). And the current detection control part 18 informs the CPU 20 of the device trouble. This imparting of the device trouble to the CPU 20 may be carried out by interruption to the CPU 20.

Upon receipt of the device trouble, the CPU 20 reads out the contents of the no-good status register 19 in the current detection control part 18, and specifies the malfunctioning device. Then, the CPU 20 instructs the current detecting part corresponding to the malfunctioning device to interrupt the current supplying path (step S35). According to the instruction, the switching circuit in the current detecting part interrupts the active current supplying path. As a result, the supplying of electric power to the malfunctioning device is stopped.

When a trouble occurs in a certain device and the supplied current increases, the increased current sometimes produces a voltage drop in the current supplying source part 11. In such a situation that the trouble occurs and the supplied current value increases, the current supplying path to the malfunctioning device is interrupted, as described above. Therefore, influence of the device malfunctioning on the remaining devices is suppressed, and hence, those other devices continue their normal operations.

In the step S35, the CPU 20 may start the execution of a process of informing the user of the device trouble occurrence, information on the malfunctioning device, and others. The user recognizes that a trouble occurs in the device, from the result of process execution, and takes an appropriate measure for the trouble.

Figure 3:
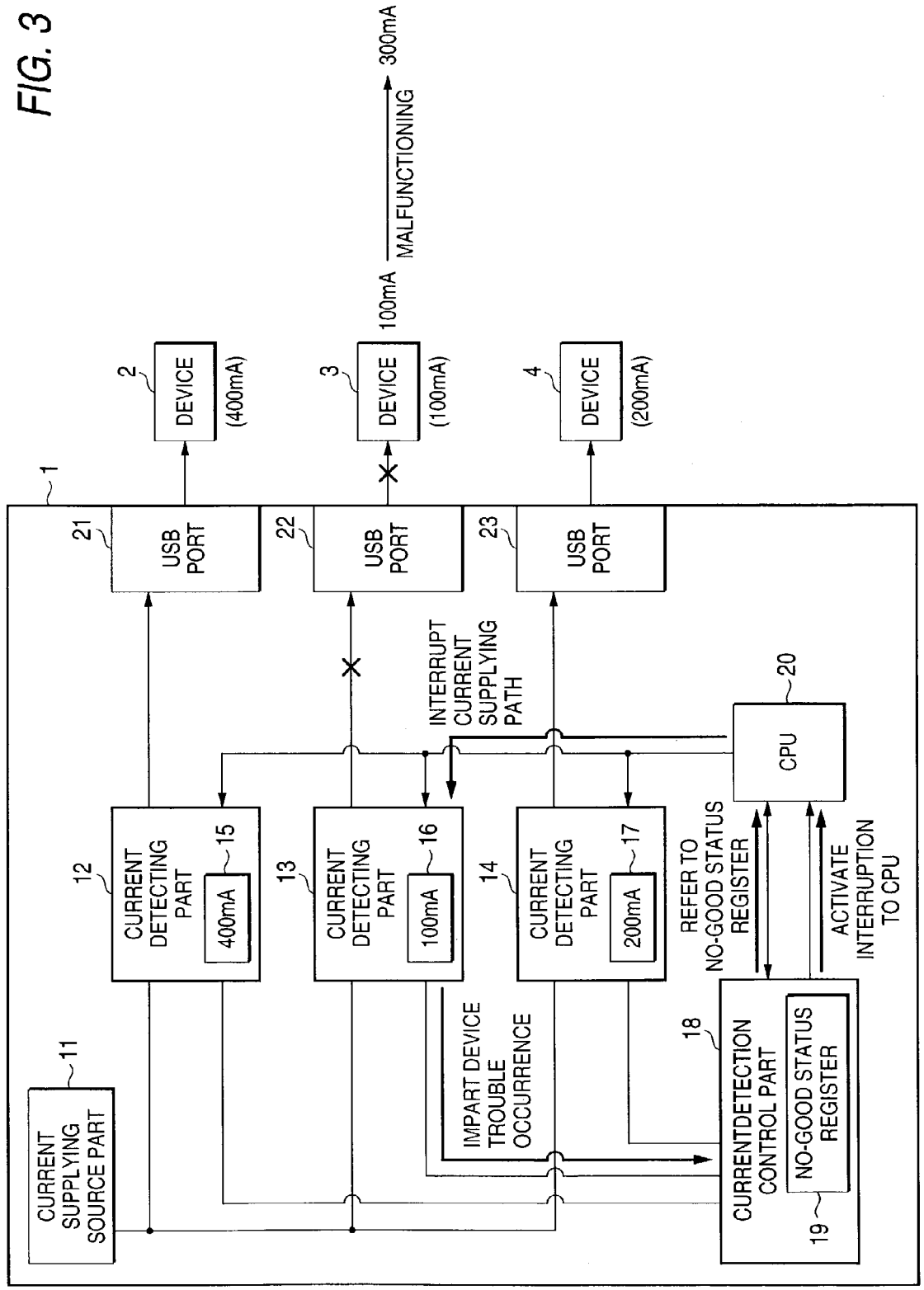
FIG. 3 is a block diagram useful in explaining a specific device abnormality detecting operation in the USB device.

FIG. 3 is a block diagram useful in explaining a specific device abnormality detecting operation in the USB device which is the embodiment of the present invention. The device abnormality detecting operation will be described by using specific examples. Values of currents consumed by the devices 2 to 4 are 400 mA, 100 mA, and 200 mA, respectively. To start, the device 2 is connected to the USB port 21. In turn, the CPU 20 acquires 400 mA as the current value of current consumed by the device 2 through the communication with the device 2 at the initial setting stage, and sets 400 mA as a detecting current value in the detector register 15 of the current detecting part 12. When the device 3 is connected to the USB port 22, the CPU 20 likewise acquires 100 mA as the current value of current consumed by the device 3 through the communication with the device 3 at the initial setting stage, and sets 100 mA as a detecting current value in the detector register 16 of the current detecting part 13. When the device 4 is connected to the USB port 23, the CPU 20 likewise acquires 200 mA as the current value of current consumed by the device 4 through the communication with the device 4 at the initial setting stage, and sets 200 mA as a detecting current value in the detector register 17 of the current detecting part 14.

Thereafter, the current detecting part 12 monitors a current value of current supplied to the device 2, and compares the monitored current value with a detecting current value (400 mA) set in the detector register 15. If the supplied current value is within the detecting current value, the current detecting part 12 continues it's monitoring. The current detecting part 13 monitors a current value of current supplied to the device 3, and compares the monitored current value with a detecting current value (100 mA) set in the detector register 16. If the supplied current value is within the detecting current value, the current detecting part continues it's monitoring. The current detecting part 14 monitors a current value of current supplied to the device 4, and compares the monitored current value with a detecting current value (200 mA) set in the detector register 17. If the supplied current value is within the detecting current value, the current detecting part continues it's monitoring.

In this instance, a trouble occurs in the device 3 and current of 300 mA flows through the device. In this case, the current value (300 mA) of the current fed to the device 3 exceeds the detecting current value (100 mA). The current detecting part 13 detects the overcurrent, and informs the current detection control part 18 that the supplied current value exceeds the detecting current value. The current detection control part 18 receives the report of device trouble from the current detecting part 13, sets a bit in the no-good status register 19 corresponding to the current detecting part 13 (i.e., corresponding to the device 3), and activates interruption to the CPU 20 to inform the CPU of the device trouble.

The CPU 20 refers to the no-good status register 19 in the current detection control part 18, and recognizes that a trouble occurs in the device 3. And, the CPU instructs the current detecting part 13 to interrupt the current supplying path to the device 3. In response to the instruction of interrupting the current supplying path from the CPU 20, the switching circuit in the current detecting part 13 operates to interrupt the current supplying path to the cable 3. The CPU 20 carries out a process of informing the user that a trouble occurs in the device 3.

In this way, the supplying of electric power to the malfunctioning device 3 is stopped to thereby preventing adverse influence to the remaining devices. As in the case mentioned above, the current value of the current fed to the device 3 is 300 mA even in the abnormal state. The USB standards allow the supplying of current up to 500 mA. Also in the conventional device, an overcurrent protecting circuit is included which operates when the supplied current reaches 500 mA, to thereby restrict the current amount. In an abnormal state where the supplied current is 500 mA or smaller, the protecting circuit does not operate and cannot detect the abnormality. On the other hand, the USB device of the invention is capable of detecting an abnormality within the current limiting range, and when the device is abnormal, separates the abnormal device from the circuit, and imparts the device abnormality to the user. If current of 300 mA flows in the device 3, the USB device detects that the device is abnormal. However, in the device 1, even if current of 400 mA, larger than 300 mA, flows, the supplying of current to the device 1 is not interrupted, as a matter of course.

In the description of the exemplar operation and the specific embodiment, control acquires a current value of the current consumed by the device, and is set as a detecting current value. In the devices which are already known, as in the case of assembling use, the detecting current values may be preset. The USB device may be constructed such that the user sets the detecting current values corresponding to the devices to be connected.

The USB device described above is arranged such that any of the current detecting parts 12 to 14 detects that the supplied current value exceeds the detecting current value, imparts the excessive current status to the current detection control part 18 and to the CPU 20, and then the CPU 20 responsively interrupts the current supplying path. The same function may be realized in another manner that the current detection control part 18 instructs the current detecting part having informed the excessive current status to interrupt the current supplying path, or that the current detecting part itself directly interrupts the current supplying path connecting thereto.

In the embodiment mentioned above, each of the current detecting parts 12 to 14 detects if the supplied current value exceeds the detecting current value to thereby detect a device abnormality. Further, a down state of the USB device may be detected in a manner that while the same arrangement is employed, a lower limit of current value is preset, and lowering of the supplied current value below the lower limit is detected.

As seen from the foregoing description, the USB device of the invention is capable of detecting failures in power systems of the devices connected to the USB device through the USB interface, and capable of disconnecting the failure device from the USB device. With this feature, the invention successfully eliminates such an unwanted situation that when a single power source is supplying electric power to a plurality of devices, the device or devices connected malfunctions and the power voltage drops, and the remaining devices are adversely affected by the voltage drop. This ensures reliable operations of the devices connected through the USB interface.

What is claimed is:

1. A USB device for supplying current to a device connected thereto through a USB interface, comprising:
   a current detector which compares a current value of current of electric power supplied to the device with a preset detecting current value;
   a current detection controller which decides that the device is abnormal when the result of the comparing by the current detector shows that the current value exceeds the detecting current value; and
   a setting unit which writably retains the detecting current value based on a threshold value received from the device.

2. The USB device according to claim 1, further comprising a plurality of USB ports;
   wherein the current detector is provided for each of the USB ports; and
   the current detector controller recognizes an abnormality of the device for each of the USB ports.

3. The USB device according to claim 2, further comprising a setting section which sets the detecting current value for each of the USB ports based on a current value of current consumed by each of the devices.

4. The USB device according to claim 2, wherein the detecting current value is requested by the device in a communication through the USB interface between the USB device and the device.

5. The USB device according to claim 1, wherein the detecting current value is requested by the device in a communication between the USB device and the device through the USB interface.

6. The USB device according to claim 1, further comprising a current controller which interrupts a current supplying path connecting to the device judged to be abnormal by the current detection controller.

7. The USB device according to claim 1, further comprising a CPU that writes the detecting current value to the setting unit based on a current value of current consumed by the device.

* * * * *